(12) United States Patent
 Ruelle

(10) Patent No.: US 12,572,707 B2
(45) Date of Patent: Mar. 10, 2026

(54) PROTECTION OF SENSITIVE CODES

(71) Applicant: STMicroelectronics (Grand Ouest) SAS, Le Mans (FR)

(72) Inventor: Frederic Ruelle, Marigné-Laillé (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 302 days.

(21) Appl. No.: 18/191,598

(22) Filed: Mar. 28, 2023

(65) Prior Publication Data

US 2023/0315923 A1 Oct. 5, 2023

(30) Foreign Application Priority Data

Apr. 5, 2022 (FR) ...................................... 2203094

(51) Int. Cl.
G06F 21/85 (2013.01)
G06F 1/06 (2006.01)

(52) U.S. Cl.
CPC ................ G06F 21/85 (2013.01); G06F 1/06 (2013.01)

(58) Field of Classification Search
CPC . G06F 21/85; G06F 1/06; G06F 21/55; G06F 21/71; G06F 21/6245; H04W 12/12; H04L 63/14
See application file for complete search history.

(56) References Cited

U.S. PATENT DOCUMENTS

| 10,902,092 B2 * | 1/2021 | Conti ..................... G06F 9/3842 |
| 2005/0144425 A1 * | 6/2005 | Janke ...................... G06F 21/74 |
| | | 712/E9.079 |
| 2006/0090084 A1 | 4/2006 | Buer |
| 2006/0143454 A1 * | 6/2006 | Walmsley ............... G06F 21/85 |
| | | 713/170 |
| 2007/0247182 A1 * | 10/2007 | Beatty ..................... G06F 21/71 |
| | | 326/8 |
| 2011/0167496 A1 * | 7/2011 | McPhail ................. G06F 21/72 |
| | | 726/26 |
| 2018/0165455 A1 * | 6/2018 | Liguori ................... G06F 21/57 |
| 2019/0050570 A1 | 2/2019 | Kannan et al. |
| 2019/0171585 A1 * | 6/2019 | Yonemura ............... G06F 21/78 |
| 2021/0011871 A1 | 1/2021 | Blanco et al. |
| 2021/0124711 A1 | 4/2021 | Ansari et al. |
| 2025/0077646 A1 * | 3/2025 | Vellanki .................. G06F 21/54 |
| 2025/0293855 A1 * | 9/2025 | Sabev ................... H04L 9/0643 |

FOREIGN PATENT DOCUMENTS

EP 4322040 A1 * 2/2024 ............. G06F 21/79

\* cited by examiner

*Primary Examiner* — John B King
(74) *Attorney, Agent, or Firm* — Slater Matsil, LLP

(57) ABSTRACT

In an embodiment a method includes detecting, by a monitoring circuit, on a bus of a device during execution by a processor of a code stored in a memory, an address for reading from the memory, wherein the device comprises the processor, the memory, the monitory circuit and the bus coupled to the memory, comparing, by the monitoring circuit, the address with one or more first addresses and controlling, by the monitoring circuit, a clock control circuit to prevent an activation of one or more peripheral circuits when the address is part of the one or more first addresses.

20 Claims, 3 Drawing Sheets

PROTECTION OF SENSITIVE CODES

CROSS-REFERENCE TO RELATED APPLICATIONS

This application claims the benefit of French Application No. 2203094, filed on Apr. 5, 2022, which application is hereby incorporated herein by reference.

TECHNICAL FIELD

The present disclosure relates to methods and devices for the security of electronic circuits, and in particular to devices and methods for protection of codes.

BACKGROUND

When an electronic device is operating, codes, such as boot codes, software codes, or firmware codes, are executed by a processor. Data, such as cipher keys, then transit over a data bus of the device, and code instructions then transit over an instruction bus of the device.

Although there exist solutions to make data or codes inaccessible, it would be desirable to further protect the access to these codes and to sensitive data.

SUMMARY

An embodiment provides a method comprising:

the detection by a monitoring circuit, during the execution by a processor of a code stored in a memory of a device, of an address for reading from the memory, the detection being performed via a bus coupled to the memory;

the comparison by the monitoring circuit of the address with one or a plurality of first addresses;

if the address is comprised in the one or a plurality of addresses, the control, by the monitoring circuit, of a clock control circuit to prevent the activation of one or a plurality of peripheral circuits.

According to an embodiment, the control comprises the locking of a current configuration of the clock control circuit, this current configuration imposing a deactivation state to one or a plurality of the peripheral circuits.

According to an embodiment, the control comprises the deactivation of at least one of the peripheral circuits.

According to an embodiment, the clock control circuit is configured to deactivate and/or activate clock signals of the peripheral circuit(s) of the device to perform the deactivation and/or the activation of the peripheral(s), the clock signals being generated by a clock generation circuit.

According to an embodiment, if the address forms part of the one or a plurality of first addresses, the monitoring circuit toggles the state of a bit of the clock control circuit to a first state causing the locking of the clock control circuit.

According to an embodiment, when the clock control circuit is locked, clock signals generated by the clock generation circuit can no longer be modified by the control circuit.

According to an embodiment, the bit of the clock control circuit is a bit of one-time programmable type.

According to an embodiment, the method further comprises the comparison of the address with one or a plurality of second addresses, wherein, if the address forms part of one or a plurality of second addresses, the monitoring circuit toggles the state of the clock control circuit to a second state causing the unlocking of the clock control circuit.

According to an embodiment, when the clock control circuit is unlocked, clock signals generated by the clock generation circuit can no longer be modified by the control circuit.

According to an embodiment, if the address does not form part of the one or a plurality of first or second addresses, the monitoring circuit is configured not to modify the state of the bit of the clock control circuit.

According to an embodiment, the method further comprises, before the comparison of the address with one or a plurality of first addresses, the storage of one or a plurality of first addresses in a non-volatile memory of the device.

According to an embodiment, the code is a boot code of the processor of the device.

According to an embodiment, one or a plurality of first addresses form one or a plurality of address ranges.

An embodiment provides a device comprising a monitoring circuit configured to detect, during the execution by a processor of a code stored in a memory of the device, an address for reading from the memory, the detection being performed via a bus coupled to the memory, the monitoring circuit being further configured to compare the address with one or a plurality of first addresses and, when the address forms part of the one or a plurality of first addresses, to control a clock control circuit in order to prevent the activation of one or a plurality of peripheral circuits.

According to an embodiment, the clock control circuit is configured to deactivate and/or activate clock signals of the peripheral circuit(s) of the device to perform the deactivation and/or the activation of the peripheral(s), the clock signals being generated by a clock generation circuit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the design of the processing devices is well known by those skilled in the art and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
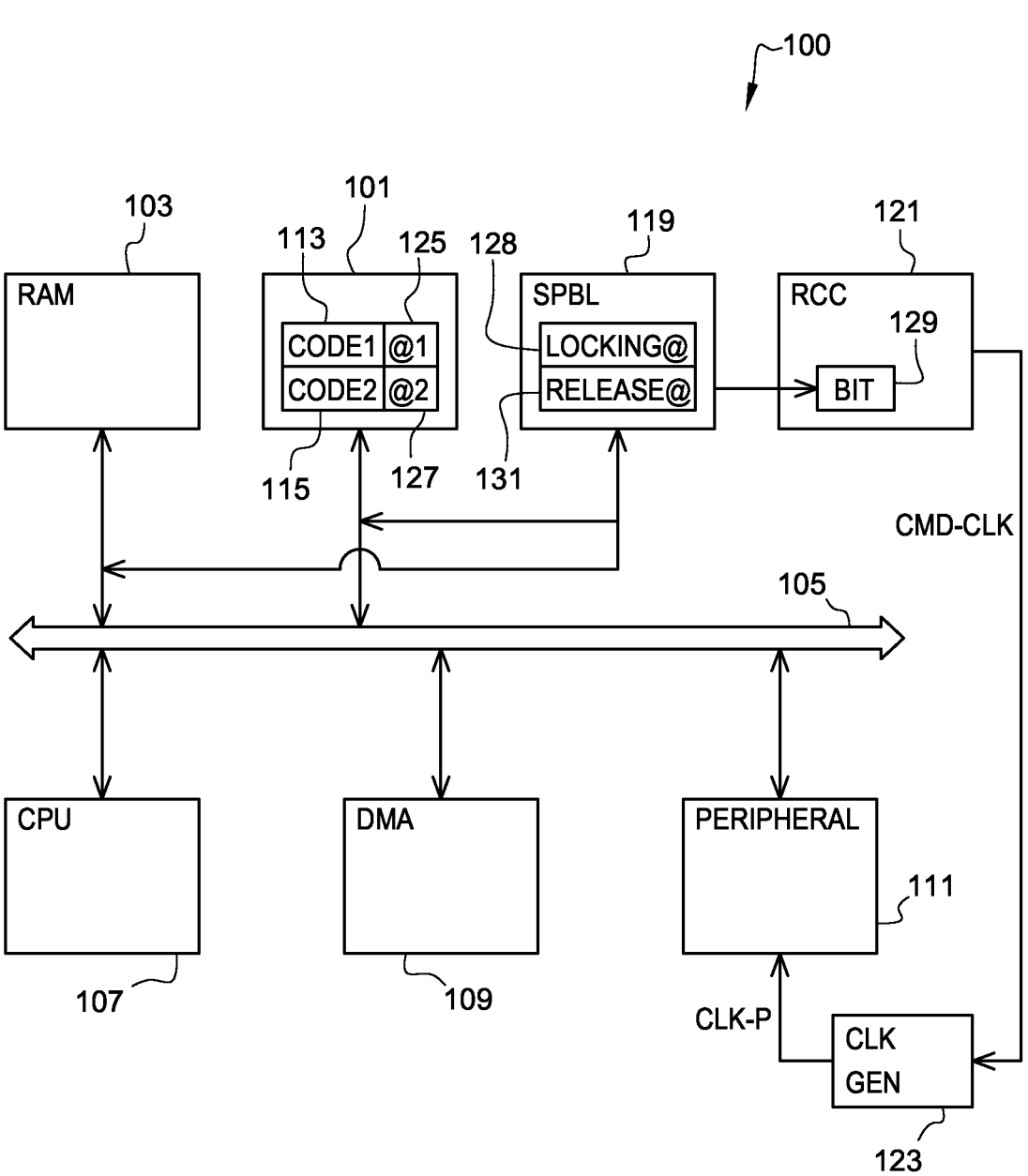
FIG. 1 very schematically shows in the form of blocks an electronic device according to an embodiment of the present disclosure.

FIG. 1 very schematically shows in the form of blocks an electronic device 100 according to an embodiment of the present disclosure.

Electronic device 100 is for example an integrated circuit, such as a system on chip, which may form part of a microcircuit card, IT hardware, etc. Device 100 for example comprises an architecture of microcontroller type or of microprocessor type.

Device 100 for example comprises a non-volatile memory 101 (NV MEM). As an example, memory 101 is a non-volatile FLASH-type memory. Device 100 further comprises a volatile memory 103 (RAM). Volatile memory 103 is for example a random access volatile memory. Memories 101 and 103 are for example coupled, via a bus 105, to a processor 107 (CPU), to a direct memory access circuit 109 (DMA), as well to one or a plurality of peripheral circuits 111 (PERIPHERAL).

Although an example of a device 100 comprising both non-volatile memory 101 and volatile memory 103 is illustrated, in other embodiments only one or the other of these memories may be present.

Memory 101 for example stores codes 113 and 115 (CODE1, CODE2), which are for example boot codes or other codes. Codes 113 and 115 each comprise one or a plurality of instructions executable by processor 107. Code 113 is for example sensitive in terms of security. For example, code 113 comprises, or manipulates, sensitive data such as secret keys, or has privileged accesses to sensitive data. Code 115 is for example not sensitive in terms of security.

In another example, codes 113 and 115 are stored in volatile memory 103. This is for example the case when device 100 is a device called ROM-less.

Peripheral circuits 111 may exhibit security risks when they are activated during the execution of the sensitive codes, such as code 113. For example, when device boo carries out a boot procedure based on code 113, an attacker may have access, via one of the peripheral circuits 111, to bus 105 and for example inject malicious codes into device boo or recover data or codes sensitive in terms of confidentiality.

Device 100 further comprises a monitoring circuit 119 (SBPL) coupled to a reset clock circuit 121 (RCC). Monitoring circuit 119 is implemented in hardware fashion, for example, based on logic gates.

Clock control circuit 121 is configured to generate a signal CMD-CLK controlling a clock generation circuit 123. Signal CMD-CLK enables clock generation circuit 123 to generate clock signals CLK-P rating one or a plurality of peripheral circuits 111.

According to an embodiment, clock control circuit 121 is configurable and enables to select which peripheral circuits among peripheral circuits 111 are active and which are inactive. In other words, control signal CMD-CLK enables the clock generation circuit to transmit clock signals CLK-P to the peripheral circuits 111 selected as being active. The peripheral circuits 111 selected as being inactive receive no clock signals and are then not clocked, which makes them impossible to use.

Monitoring circuit 119 is for example configured to detect memory access addresses used during accesses to memory 101. For example, the monitoring circuit 119 is configured to detect a context in which the processing device 107 is operating, the context being defined for example by the addresses or address range of the instructions that are retrieved by the processing device 107 for execution. For example, circuit 119 is coupled to one or a plurality of lines of bus 105 over which memory access addresses are transmitted. In the example illustrated in FIG. 1, code 113 is associated with addresses 125 (@1) in memory 101, and code 115 is associated with addresses 127 (@2) in memory 101. When processor 107 sends one among addresses 125 over bus 105 before or after the execution of code 113, monitoring circuit 119 detects the passage of this address over bus 105 and keeps a copy of the address. Similarly, when processor 107 sends one among addresses 127 over bus 105 before or after the execution of code 115, monitoring circuit 119 detects and keeps this address.

Monitoring circuit 119 is further configured to compare each detected address with one or a plurality of addresses 128 (LOCKING@) stored for example in a memory of circuit 119. For example, addresses 128 comprise a list of addresses, or one or a plurality of address ranges. An address range, for example, corresponds to a context in which the processing device 107 is operating, and is characterized by a lower threshold address and an upper threshold address. Monitoring circuit 119 is then configured to verify whether a detected address belongs to the context, that is to say is greater than the lower threshold address and lower than the upper threshold address or not.

According to an embodiment, when the detected address forms part of one or a plurality of addresses 128, monitoring circuit 119 is configured to lock clock control circuit 121. The current configuration of clock control circuit 121 is then set. In other words, control signal CMD-CLK cannot be modified and each peripheral circuit in then remains in the state where it is. As an alternative or additionally, monitoring circuit 119 is configured to control, via clock control circuit 121 and when the detected address forms part of one or a plurality of addresses 128, the deactivation of one or a plurality of peripheral circuits 111. For example, when the detected address forms part of one or a plurality of addresses 128, monitoring circuit 119 forces clock control circuit 121 to deactivate all the peripheral circuits in and then locks clock control circuit 121. The current configuration, deactivating all the peripheral circuits 111, is then set.

The locking of clock control circuit 121 is for example based on the state of a bit 129 (BIT) stored in clock control circuit 121. When bit 129 is in a release state, for example, state 0, circuit 121 is for example unlocked and it configurable. More particularly, signal CMD-CLK for controlling clock generation circuit 123 may be modified. When bit 129 is in a locking state, for example, state 1, clock control circuit 121 is no longer configurable and signal CMD-CLK for controlling clock generation circuit 123 cannot be modified. The configuration of clock control circuit 121 is then set. When the detected address forms part of addresses 128, monitoring circuit 119 is for example configured to impose the locking state to bit 129. If this bit was in the release state, the state of bit 129 toggles, triggering the locking of clock control circuit 121. As an alternative or additionally, the toggling of bit 129 to the locking state further imposes the deactivation of all or part of peripheral circuits 111, such as for example the peripherals increasing the system attack surface area such as communication peripherals of UART (Universal Asynchronous Receiver-Transmitter), SPI (Serial Peripheral Interface), and/or I2C (Interface to Communicate) type, and/or ADC (analog-to-digital converter) data acquisition peripherals, and/or the circuit of access to memory 109. As an example, the peripheral circuits having no interface with the outside of device 100 are not concerned by the deactivation. For example, in certain cases, peripheral circuits 111 comprise a time clock which is not concerned by the deactivation and keeps on being clocked by the clock generation circuit.

According to another embodiment, the selection of the peripheral circuits 111 concerned by the locking of clock control circuit 121 is specified via a bit field and the toggling of the state of bit 129 then automatically triggers the toggling of the state of the bits in the bit field.

According to an embodiment, monitoring circuit 119 is further configured to compare each detected address with one or a plurality of addresses 131 (RELEASE@) stored for example in the memory of circuit 119. For example, addresses 131 comprise a list of addresses, or one or a plurality of address ranges. In the case where the detected address forms part of one or of a plurality of addresses 131, and if clock control circuit 121 is locked, monitoring circuit 119 is configured to toggle the state of bit 129 to the release state. Clock control circuit 121 is then unlocked and becomes configurable. In particular, the control signal CMD-CLK transmitted to clock generation circuit 123 may be modified. Similarly, if clock control circuit 121 is unlocked and the detected address does not form part of one or a plurality of addresses 131, monitoring circuit 119 is then configured to toggle the state of bit 129 to the locking state, thus locking clock control circuit 121.

According to an embodiment, the memory of circuit 119 stores the one or a plurality of addresses 128 as well as the one or a plurality of addresses 131. When a read address does not form part of addresses 128 and 131, monitoring circuit 119 does not toggle the state of bit 129. Clock control circuit 121 then remains in the state where it was. In other words, clock control circuit 121 is configurable if the state of bit 129 is the release state, and is not configurable if the state of bit 119 is the locking state.

Of course, only one or a plurality of addresses 128 may be stored in the memory of monitoring circuit 119, the one or a plurality of addresses 131 not being stored, in which case circuit 119 is for example configured to toggle the state of bit 129 to the release state when the read address does not form part of the one or a plurality of addresses 128. Similarly, only the one or a plurality of addresses 131 may be stored in the memory of monitoring circuit 119, the one or a plurality of addresses 128 not being stored, in which case circuit 119 is for example configured to toggle the state of bit 129 to the locking state when the read address does not form part of the one or a plurality of addresses 131.

According to an embodiment, when device wo turns on and starts its boot procedure, clock control circuit 121 is configurable, bit 129 being in the release state by default. As soon as processor 107 triggers an operation of recovery of an instruction at an address in memory 101, for example, an address forming part of the one or a plurality of addresses 128, the state of bit 129 toggles, causing the locking of clock control circuit 121.

According to another embodiment, when device wo turns on and starts its boot procedure, clock control circuit 121 is locked and is not configurable, bit 129 being in the locking state by default. As an example, all peripheral circuits 111 are deactivated and control signal CMD-CLK cannot be modified. Control signal CMD-CLK can then only be modified when processor 107 will trigger an operation of recovery of an instruction at an address, for example forming part of one or a plurality of addresses 131 in memory 101, causing the unlocking of clock control circuit 121.

Figure 2:
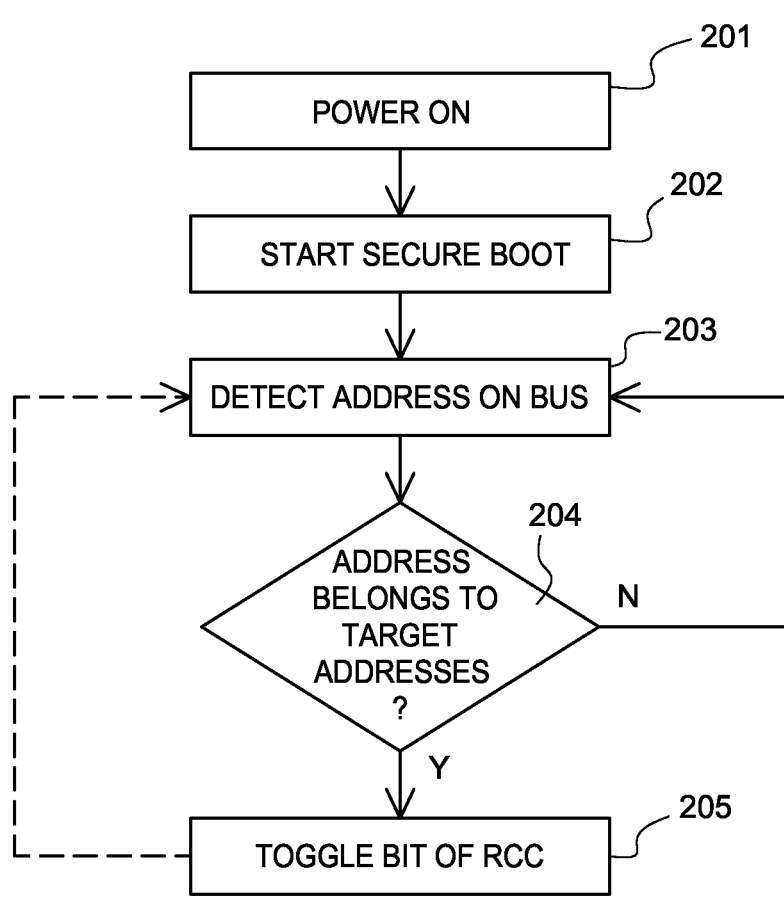
FIG. 2 is a flowchart showing operations of a method of secure boot of an electronic device according to an example of embodiment of the present disclosure.

FIG. 2 is a flowchart showing operations of a method of secure boot of an electronic device 100 according to an example of embodiment of the present disclosure. The example of FIG. 2 is based on the presence of addresses 128 and 131 stored in the memory of monitoring circuit 119. Those skilled in the art will know how to adapt the method for the case where only addresses 128 or only addresses 131 are present.

At a step 201 (POWER ON), electronic device 100 is turned on, for example, after a reset.

The secure boot process then starts at a step 202 (START SECURE BOOT). Processor 107 recovers instructions of the boot code stored in memory 101, and executes them to perform the booting. The addresses of the instructions of the boot code are then loaded into bus 105, the boot code for example comprising codes 113 and 115.

At a step 203 (DETECT ADDRESS ON BUS), locking circuit 117 detects the passage over bus 105, and via monitoring circuit 119, an address at which is stored an instruction of the boot code, the address being for example one among the addresses 125 at which an instruction of code 113 is stored or one among the addresses 127 at which an instruction of code 115 is stored.

At a step 204 (ADDRESS BELONGS TO TARGET ADDRESSES?), monitoring circuit 119 determines whether the address detected at step 203 forms part of the one or a plurality of addresses 128 and/or 131.

When the detected address does not form part of the one or a plurality of addresses 128 and/or 131 (branch N), the method resumes at step 203 and monitoring circuit 119 is waiting for the detection of a new address transiting over bus 105.

According to an embodiment, when the detected address does not form part of the one or a plurality of addresses 128 and/or 131 (branch N), the code is executed and the peripheral circuit(s) used are deactivated once their action has been performed.

According to another embodiment, the lists of addresses 128 and 131 define address ranges, each range being for example defined by threshold addresses of the range, which may enable to protect the circuit in the case where an attacker succeeds in preventing specific addresses from transiting over bus 105. Device 100 for example comprises a state machine (not illustrated in FIG. 1) configured to compare the addresses transiting over bus 105 with the address ranges. For example, addresses 128 and 131 each comprise a single address and the state machine is configured to toggle bit 129 to the locking state when the sampled address belongs to the address range between address 128 and address 131 and to toggle bit 129 to the release state when the detected address does not belong to the address range between address 128 and address 131. Once the upper threshold address has been read, the clock control circuit 121 is for example unlocked and the activation of one or more peripheral circuits is possible.

When the detected address forms part of the one or a plurality of addresses 128 and/or 131 (branch Y), the method continues at a step 205 (TOGGLE BIT OF RCC) where monitoring circuit 119 toggles the state of bit 129 to the locking state if the detected address forms part of the one or a plurality of addresses 128, or to the release state if the detected address forms part of the one or a plurality of addresses 131. The toggling of the state of bit 129 then causes the locking or the unlocking of clock control circuit 121 and thus sets or de-sets the current configuration of peripheral circuits 111.

According to an embodiment, clock control circuit 121 is locked on booting of device 100 and is unlocked when the address detected by monitoring circuit 119 forms part of the one or a plurality of addresses 131. The one or a plurality of addresses 128 are, in this embodiment, not stored by monitoring circuit 119. Thus, an initial configuration of clock control circuit 121 is for example preprogrammed.

According to an embodiment, bit 129 is of one-time programmable type such as of fuse type. In this case, the method ends after the carrying out of step 205 and clock control circuit 121 is locked and accordingly is no longer configurable, at least until the nest resetting of device 100.

When bit 129 is reprogrammable, and after step 205, the method resumes at step 203 where monitoring circuit 119 is waiting for the detection of a new address transition over bus 105.

According to an embodiment, only when the one or a plurality of addresses 128 or only when the one or a plurality of addresses 131 are stored by circuit 119, and when the detected address does not form part of the one or a plurality of stored addresses (branch N at the output of step 204), the method carries on for example in an implementation of step 205 where the state of the bit is toggled to the release state or to the locking state, according to the one or a plurality of detected addresses.

As an example, bit 129 is one-time programmable and is by default in the release state. Clock control circuit 121 is not locked and is accordingly configurable to determine which are the active or inactive peripheral circuits 111. For example, the resetting of device 100 is performed at least partly via another device, coupled to device 100 via one of peripheral circuits 111. As soon as peripheral circuits 111 are no longer useful in the reset process, clock control circuit 121 is for example configured to modify control signal CMD-CLK so that clock generation circuit 123 no longer rates the concerned peripheral circuits 111. Monitoring circuit 119 is then configured to toggle the state of bit 129 and accordingly deactivate the concerned peripheral circuits in until the next resetting of device 100.

The method described in relation with FIG. 2 takes the example of the booting of device 100, implying the execution of the boot codes. In other embodiments, the method, and in particular steps 203 to 205, could be applied to other procedures than the booting of device 100, for example during the execution of other codes after the booting.

Figure 3:
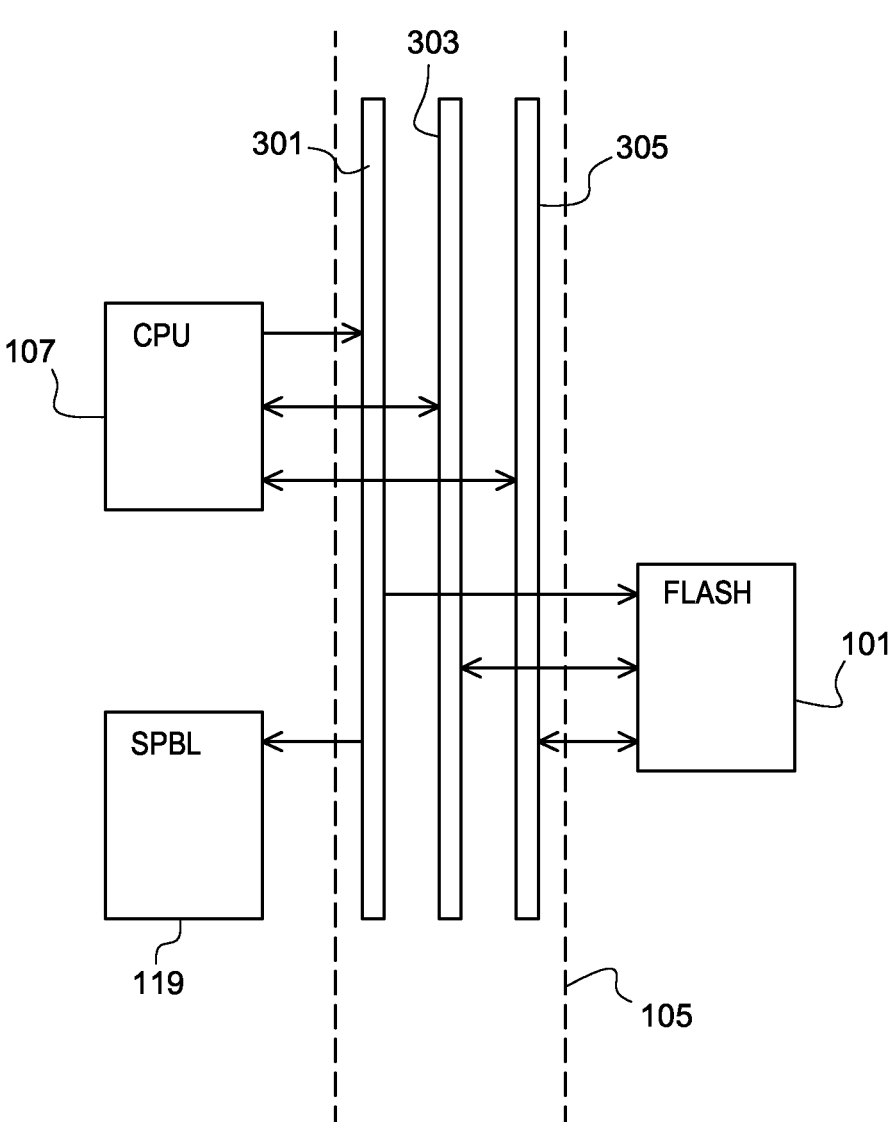
FIG. 3 illustrates in further detail a bus according to an embodiment of the present disclosure.

FIG. 3 illustrates in further detail an embodiment of bus 105 and of its connections with memory 101, processor 107 and monitoring circuit 119.

Bus 105 for example comprises buses dedicated to communications between processor 107 and memory 101, these buses for example comprising an addressing bus 301, a data bus 303, and a control bus 305.

Processor 107 is coupled to addressing bus 301 to send thereto the addresses for reading from the memory cells to which it wants to access. For example, processor 107 sends one among addresses 125 over bus 301 to access one of the instructions of code 113. Data bus 303 is configured to convey the data, for example, the code 113 stored at memory address 125, between memory 101 and processor 107.

Control bus 305 is for example used to transmit control signals in relation with the accesses to memory 101, such as write or read control signals.

Addressing bus 301 is further coupled to monitoring circuit 119. Monitoring circuit 119 is for example configured to detect the signals transmitted over addressing bus 301. For example, addressing bus 301 is a bus configured for transmissions in parallel to n bits at a time, over n corresponding lines, where n is for example equal to 16, 32, or 64, although other values are possible. Each transmission of n bits over bus 301 for example represents an address. Monitoring circuit 119 is configured to detect the signal over each of the n lines. Of course, other types of transmissions of addresses over bus 301 are possible.

Buses 303 and 305 are for example not coupled to monitoring circuit 119.

An advantage of the described embodiments is that they provide a certain protection against glitch-type attacks. Indeed, even if an attacker waits for the unlocking of the peripheral circuits as a result of the execution of boot codes, and uses at this time a glitch attack to return to the execution of one of the critical codes, the passage of the memory address of the code over the addressing bus will automatically lock the peripheral circuits. Thus, the attacker will not have access to the desired code through the peripheral circuits.

Another advantage of the described embodiments is that all the interfaces of device wo may be deactivated at the same time, without it being necessary to monitor the interfaces.

Another advantage of the described embodiments is that the locking or the unlocking of clock control circuit 121 enables to open or to close the possibility of making selected peripherals active or inactive via clock signals CLK-P.

Another advantage of the described embodiments is that the locking of clock control circuit 121 is a hardware locking.

Still another advantage of the described embodiments is that the triggering of the locking and of the unlocking of peripheral circuits 111 is automatic.

Various embodiments and variants have been described. Those skilled in the art will understand that certain features of these various embodiments and variants may be combined, and other variants will occur to those skilled in the art. In particular, monitoring circuit 111 is configured to sample, in addition to the addresses sent by processor 107, other addresses transiting over addressing bus 301 such as addresses sent by memory access circuit 109. The type of bit 129 may also vary, for example, bit 129 is a multiple-time programmable or one-time programmable bit, or also be a bit of fuse type. Further, the one or a plurality of addresses 128 or 131 may be stored in monitoring circuit 119 in the form of one or a plurality of address ranges.

Finally, the practical implementation of the described embodiments and variants is within the abilities of those skilled in the art based on the functional indications given hereabove.

What is claimed is:

1. A method for operating a device comprising a processor, a memory, a monitoring circuit and a bus connecting the processor and the memory, the method comprising:

detecting, by the monitoring circuit, memory addresses on the bus accessed by the processor during execution of a code corresponding to the memory addresses and stored in the memory;

comparing, by the monitoring circuit, an address with one or more first addresses; and controlling, by the monitoring circuit, a clock control circuit based on the comparison in order to control one or more peripheral circuits;

sending, by the clock control circuit, signals to the one or more peripheral circuits so as to perform a deactivation and/or an activation of the one or more peripheral circuits; and switching, by the monitoring circuit, a state of a bit of the clock control circuit to a first state causing locking of the clock control circuit when the address is part of the one or more first addresses.

2. The method according to claim 1, wherein the clock control circuit controls a clock generation circuit, and wherein clock signals generated by the clock generation circuit are no longer modifiable by the clock control circuit when the clock control circuit is locked.

3. The method according to claim 1, wherein the bit of the clock control circuit is a bit of one-time programmable type.

4. The method according to claim 1, further comprising:

comparing, by the monitoring circuit, the address with one or more second addresses; and switching, by the monitoring circuit, the state of the bit of the clock control circuit to a second state causing unlocking of the clock control circuit when the address is part of the one or more second addresses.

5. The method according to claim 4, wherein the clock control circuit controls a clock generation circuit, and wherein clock signals generated by the clock generation circuit are modifiable by the clock control circuit when the clock control circuit is unlocked.

6. The method according to claim 4, further comprising not modifying, by the monitoring circuit, the state of the bit of the clock control circuit when the address is not part of the one or more first or second addresses.

7. The method according to claim 1, further comprising, before comparing the address with the one or more first addresses, storing the one or more first addresses in the memory, wherein the memory is a non-volatile memory.

8. The method according to claim 1, wherein the code is a boot code of the processor.

9. The method according to claim 1, wherein the one or more first addresses form one or more address ranges, each address range being defined by a lower threshold address and an upper threshold address, and wherein the clock control circuit is configured to allow activation of at least one of the peripheral circuits among the one or more peripheral circuits when the upper threshold address has been read.

10. The method according to claim 1, wherein the one or more first addresses define a context in which the processor operates.

11. A device comprising:

a processor;

a memory;

a bus connected to the processor and the memory;

a clock control circuit;

one or more peripheral circuits; and a monitoring circuit configured to:

detect memory addresses on the bus accessed by the processor during execution of a code corresponding to the memory addresses and stored in the memory;

compare an address with one or more first addresses; and control the clock control circuit based on the comparison in order to control the one or more peripheral circuits, wherein the clock control circuit is configured to deactivate and/or activate clock signals for the one or more peripheral circuits to perform a deactivation and/or the activation of the one or more peripheral circuits, the clock signals being generated by a clock generation circuit, and wherein the monitoring circuit is further configured to switch a state of a bit of the clock control circuit to a first state to lock the clock control circuit when the address is part of the one or more first addresses.

12. The device according to claim 11, wherein the clock signals generated by the clock generation circuit are no longer modifiable by the clock control circuit when the clock control circuit is locked.

13. The device according to claim 12, whereinthe bit of the clock control circuit is a bit of one-time programmable type.

14. A method for operating a device comprising a processor, a memory, a monitoring circuit and a bus connecting the processor and the memory, the method comprising:

monitoring, by the monitoring circuit, memory addresses on the bus accessed by the processor during execution of a code corresponding to the memory addresses and stored in the memory;

comparing, by the monitoring circuit, an accessed address with predetermined protected addresses; and based on a comparison, controlling, by the monitoring circuit, one or more peripheral circuits to be in an active state or in a deactivated state, wherein the controlling comprises controlling a clock control circuit based on a state of a bit stored in the clock control circuit.

15. The method according to claim 14, wherein controlling comprises controlling the clock control circuit for sending a signal to the one or more peripheral circuits.

16. The method according to claim 14, wherein controlling comprises locking the clock control circuit so that each peripheral circuit remains in a state in which it is in response to determining that an accessed memory address is a predetermined protected address.

17. The method according to claim 14, wherein controlling comprises controlling the clock control circuit to deactivate the one or more peripheral circuits in response to determining that the accessed memory address is a predetermined protected address.

18. The method according to claim 17, wherein controlling further comprises locking the clock control circuit after deactivating the one or more peripheral circuits.

19. The method according to claim 14, wherein the clock control circuit activates or deactivates the peripheral circuits based on the state of the bit stored in the clock control circuit.

20. The method according to claim 19, wherein the monitoring circuit controls the bit.

* * * * *